United States Patent [19]
Cheng et al.

[11] Patent Number: 5,706,453
[45] Date of Patent: Jan. 6, 1998

[54] INTELLIGENT REAL-TIME GRAPHIC-OBJECT TO DATABASE LINKING-ACTUATOR FOR ENABLING INTUITIVE ON-SCREEN CHANGES AND CONTROL OF SYSTEM CONFIGURATION

[76] Inventors: Yang-Leh Cheng, 2948 Mariposa Dr., Burlingame, Calif. 94010; Andrew Y. Cheng, 1032 Prouty Way, San Jose, Calif. 95129

[21] Appl. No.: 384,016

[22] Filed: Feb. 6, 1995

[51] Int. Cl.$^6$ ............................................. G06F 15/00
[52] U.S. Cl. .................... 395/347; 395/964; 395/967
[58] Field of Search ........................... 395/155, 340, 395/347, 348–351, 964, 965, 967, 970

[56] References Cited

U.S. PATENT DOCUMENTS

| | | | |
|---|---|---|---|
| 5,168,441 | 12/1992 | Onarheim et al. | 364/146 |
| 5,386,568 | 1/1995 | Wold et al. | 395/700 |
| 5,430,837 | 7/1995 | Matsuo | 395/155 |
| 5,481,668 | 1/1996 | Marcus | 395/161 |
| 5,500,934 | 3/1996 | Austin et al. | 395/155 |

OTHER PUBLICATIONS

Nan C. Shu, "Visual Programming", 1988, pp. 190–238.

*Primary Examiner*—Mark R. Powell
*Assistant Examiner*—Huynh Ba
*Attorney, Agent, or Firm*—Bo-In Lin

[57] ABSTRACT

A configuration management system which generates and updates its own real-time dynamic database for representing a system configuration. The configuration management system includes an user interface for receiving user input of free-hand graphic drawings representing system configuration changes. The configuration management system further includes an interactive graphic interpretive and linking actuator which employs the user input of free-hand graphic drawings representing the system configuration changes for linking to sections of the database corresponding to the user input of configuration changes and updating data stored therein thus representing a new system configuration updated by the user input of the configuration changes. The user interface future includes a dialog box for receiving system parameters relating to the user input of free-hand graphic drawings representing the system configuration changes. The interactive graphic interpretive and linking actuator further employs the system parameters received from the dialog box for updating the database.

15 Claims, 23 Drawing Sheets

INTELLIGENT REAL-TIME GRAPHIC-OBJECT TO DATABASE LINKING-ACTUATOR FOR ENABLING INTUITIVE ON-SCREEN CHANGES AND CONTROL OF SYSTEM CONFIGURATION

BACKGROUND OF THE INVENTION

1. Field of the Invention

This invention relates generally to system configuration control and simulation for managing and changing the process flow and sequences. More particularly, this invention relates to system configuration control and simulation by providing an intelligent real-time graphic-object to database linking actuator including a graphic interpreter with dialing box to allow on-screen intuitive modification and actuation of the changes to system configuration while providing instantaneous graphic representation of the updated configuration as immediate feedback to allow interactive evaluation and verification of the configuration changes.

2. Description of the Prior Art

Conventional techniques for managing system configuration changes, e.g., pipe re-route in an oil refinery plant, by applying either system simulation or process modeling are limited by the problems that these processes are very fragmented and highly abstract. The main reason for such difficulties is due to the fact that convention techniques are 'numerical-based'. In the original design stage, the system configuration and the changes are typically represented graphically by connecting lines, nodes and symbols representing components such as pumps, valves, etc. In order to perform the process modeling or simulation analyses, the pictorial changes have to be converted to numerical data as readable input to a simulation program. The results of the simulation analyses are also received as numerical data to be further implemented to the system. A user's concept of changes, usually representable in pictorial forms are subsequently be handled in a totally abstract and fragmented manner. From a system designer's or system operator's perspective, the entire processes are therefore indirect, remote and very inefficient.

Recently, aided by the processing power and the graphical capabilities provided by the computers, many development efforts are devoted to resolve these difficulties. In a synthesized simulation program, i.e., Engineer's Aid 3.1, the system configuration including the connecting lines, nodes, and various elements are entered as numerical input A pictorial representation is subsequently generated, but that is used only for visual verification purpose. After inspecting the 'pictures', i.e., the graphic representations, of the system, if further modifications on the configuration are required, the processes of entering numerical data have to be repeated. The user interface of this Engineer's Aid is still numerical based.

An useful design tool is provided by this simulation program to allow a visual examination and verification to be performed before the corresponding data are employed in numerical simulation analyses. However, this simulation program is limited by the approach that the node locations on the screen are coordinate-based and preset by computer program in a form of data array defined in the program. The locations of these nodes are fixed. The graphics are treated by the computer program as connecting lines among pre-defined fixed nodes. While this is a Windows-based program, a user is prompted to enter pipe and node definition by keyboard. Furthermore, in applying the graphical input interface, if the system configuration includes loops, then the loop and each nodes in that loop have to be separately 'declared' by special 'loop and node' data. Again, an user is not provided with mediate feedback to determine if the data entered indeed represent the system configuration. Subsequent processes are required to generate a pictorial representation of the data for visual verification. Due to this programming approach, the simulation program is limited by the difficulties that the configuration data in numerical form has to be entered first. A user can not look at a pictorial presentation simultaneously on the screen when these numbers are entered as immediate feedback to determine whether the numbers being entered are correct or not.

In yet another simulation program, AFT Fathom by Applied Flow Technology, the connectivity relationship between nodes can be defined by drawing lines. However, a 'component' such as an elbow, a pump, or a node point, etc., can only be defined by 'dragging' a graphic representation of such a component from the palette or 'tool box' on a screen and dropping the component to be included in the system at the intended locations. The simulation program takes these graphic input as instructions to define the system responses. For example, in order to include the flow elements, e.g., a tee, or a branch to a piping system, a user has to enter each of these elements manually, one at a time, each one as a node point, by employing the 'drag and drop' method. The graphic construction of such a system is very time consuming and requires elaborate user efforts.

Similarly, in another simulation program SIMSCI by Simulation Science Inc., symbols such as mixer or splitter has to be incorporated. These symbols are applied to provide instructions to the simulation program. The intersections of lines has to incorporate the instructions according to the arrangement of the symbols in order to construct a system configuration. The simulation program is sequentially 'taught' of the points where the flow splits, merges occur. Therefore, this simulation program is again limited by the difficulty that additional user efforts are required to define each intersection a priori.

Several U.S. patents described below reflect in general the state of the art of computer simulation for management of the user interface to input configuration changes. Palmer disclosed in an U.S. Pat. No. 5,276,791 entitled 'Network Editing System' (issued on Jan. 4, 1994) a computer system which includes a display and software to create, change and delete title containing blocks and their interrelations shown in the display. The network editing system employs keyboard entries to edit a display network. This typical keyboard-command oriented network editing system is limited by the same difficulties described above. Changes made to system configuration cannot be directly and graphically entered. Configuration changes must first be 'translated' into alphanumerical data and then entered by the use of keyboard. There is no immediate feedback to verify whether the keyboard entries really represent the intended configuration changes. Further changes must again processed by the use of this two-stage translation-keyboarding operations before an edited graphical representation of the changed network can be displayed.

Several U.S. patents disclose methods applying computer simulations to aid in design or data processing processes. Senba discloses in U.S. Pat. No. 4,176,788 entitled 'Programmable Sequence Control Device Simulating Flow Chart Sequences' (issued on Sep. 11, 1979) a control device for programming a control sequence by simulating the steps of a flow chart comprising several stages. Logic control circuits are employed between two stages of the flow chart simulating the signals generating from one stage of the flow chart for propagating to the next stage. The logic control circuits are programmable circuits to allow flexibility of system and control sequence changes. This invention reflects the simulation technology when the hardware logic circuits are applied to simulate a system response. The correlations between a graphic representation of a flow chart and the control logic circuits are implemented by physically changing the switches of the contact points between several control stages.

Tse et al. disclose in U.S. Pat. No. 5,261,037 entitled 'Generation and Simulation of Knowledge Bases' a database generator to generate knowledge bases from flow charts and logic trees. Few icons are used in the flowchart to simplify the database generating processes. The flowcharts and logic tree diagrams are useful for visual representation of processing sequences and logics. They are most useful for conceptual and process designs. However, the knowledge databases and flowcharts or logic trees are not directly applicable to provide a convenient design tool allowing a system designer to simulate configuration changes.

Koga et al. disclose in U.S. Pat. No. 5,287,439 entitled 'Graphic Editing Especially suitable for use in Graphic Programming, Flow Charts, etc.', a figure editing apparatus wherein a plurality of basic figures are stored in the memory. A second and third memories are used to store the correlations between the basic figures and the area in a graphic representation the areas and designated locations of these basic figures and for adding or deleting the basic figures from these locations. The editing system provides a useful tools for editing the graphic representation of flow charts or graphic programming diagrams. However, the this editing system is implemented only for changes to the graphic representation. There are not corresponding changes to the underlying databases representing the changed system configurations. Outa et al. disclose a similar graphic editing apparatus to receive handwritten graphic input, e.g., a flowchart, and generate images with adjusted sized, balanced, and lines or other graphic symbols properly aligned. Such a system is useful to generate graphic output. But, again a user is not provided with an effective graphic interface to design a system or make changes to a systems with the corresponding system data change automatically.

Therefore, there is still a need in the art of process modeling and system simulation to provide a new and improved technique, taking advantage of modem computer technology, to overcome the limitations and difficulties encountered in the prior art.

SUMMARY OF THE PRESENT INVENTION

It is therefore an object of the present invention to provide an intelligent real-time graphic-object to database linking actuator including a graphic interpreter with dialing box to allow on-screen intuitive modification and actuation of the changes to system configuration such that the aforementioned difficulties and limitations in the prior art can be overcome.

Specifically, it is an object of the present invention to provide an intelligent real-time graphic-object to database linking actuator which includes a graphical user-interface that an user can use graphic input, e.g., drawing directly on the on-screen pictures, to perform on-screen modification and to actuate system configuration changes such that immediate visual inspection of the system changes are interactively available to the user.

Another object of the present invention is to provide an intelligent real-time graphic-object to database linking actuator which includes a graphical user-interface that an user can use direct graphic input to perform on-screen modification and to actuate system configuration changes such that the configuration can be flexibly and expeditiously re-designed without extensive numerical data entry efforts.

Another object of the present invention is to provide an intelligent real-time graphic-object to database linking actuator which includes a graphical user-interface that an user can use direct graphic input to perform on-screen modification and to actuate system configuration changes such that system design and simulation results can be generated interactively and dynamically.

Briefly, in a preferred embodiment, the present invention includes a configuration management system which includes a database representing a system configuration. The configuration management system further includes an user interface for receiving user input of free-hand graphic drawings representing system configuration changes. The configuration management system further includes an interactive graphic interpretive and linking actuator employing the user input of free-hand graphic drawings representing the system configuration changes for linking to sections of the database corresponding to the user input of configuration changes and updating data stored therein thus representing a new system configuration updated by the user input of the configuration changes. The user interface further includes a dialog box for receiving system parameters relating to the user input of free-hand graphic drawings representing the system configuration changes. The interactive graphic interpretive and linking actuator further employs the system parameters received from the dialog box for updating the database.

It is an advantage of the present invention that it provides an intelligent real-time graphic-object to database linking actuator which includes a graphical user-interface that an user can use graphic input, e.g., drawing directly on the on-screen pictures, to perform on-screen modification and to actuate system configuration changes such that immediate visual inspection of the system changes are interactively available to the user.

Another advantage of the present invention is that it provides an intelligent real-time graphic-object to database linking actuator which includes a graphical user-interface that an user can use direct graphic input to perform on-screen modification and to actuate system configuration changes such that the configuration can be flexibly and expeditiously re-designed without extensive numerical data entry efforts.

Another advantage of the present invention is that it provides an intelligent real-time graphic-object to database linking actuator which includes a graphical user-interface that an user can use direct graphic input to perform on-screen modification and to actuate system configuration changes such that system design and simulation results can be generated interactively and dynamically.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
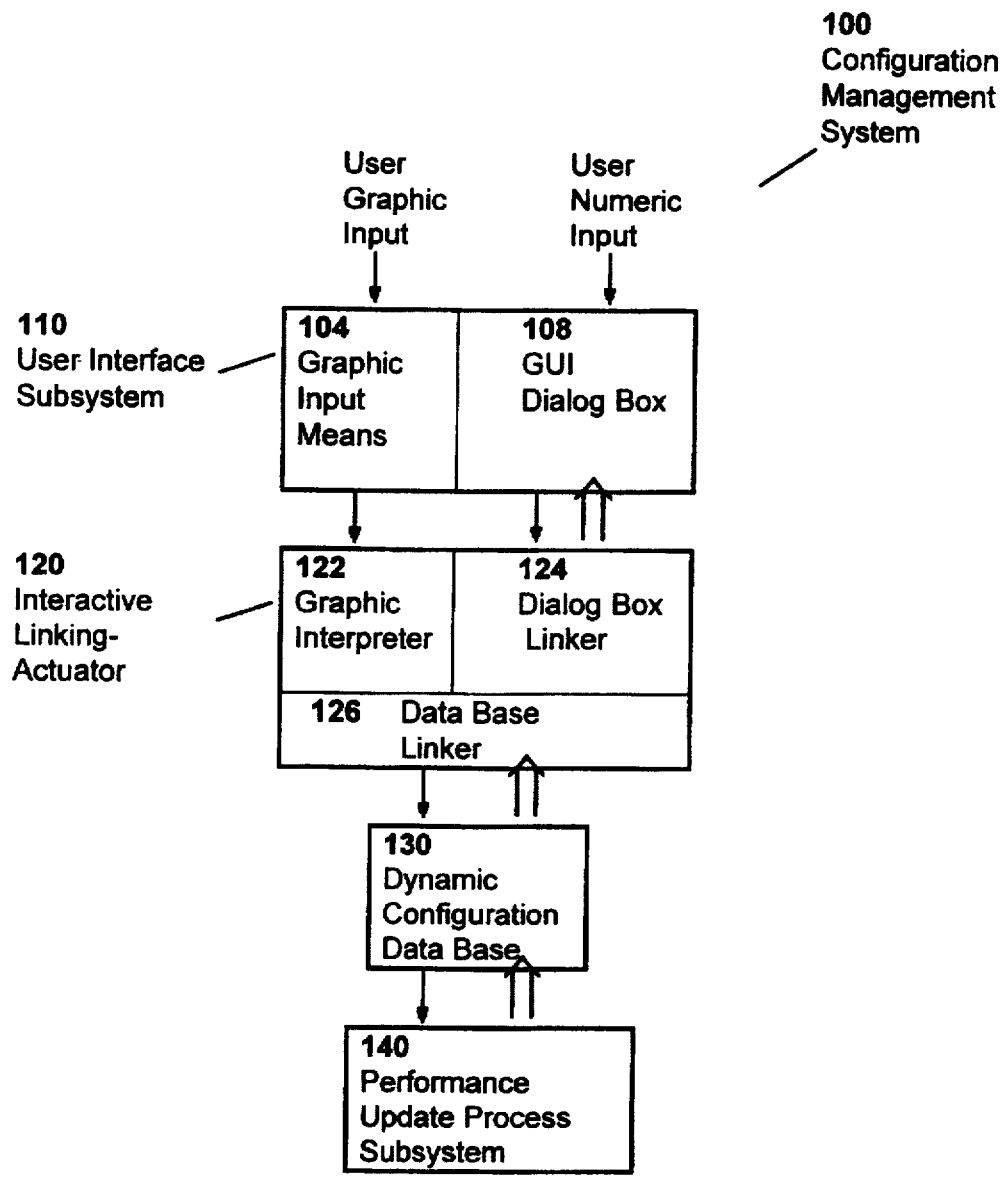
FIG. 1 is a functional network diagram of a configuration management system of the present invention.

FIG. 1 is a functional network diagram of a configuration management system 100 including a plurality of process subsystems. There are three interconnected and dynamically interactive process subsystems. The first process subsystem is an user interface subsystem 110 which includes a graphic interface means 104 which can either be a light-pen, a touch screen or a computer mouse, for an user to enter pictorial representation of system configuration changes. The system configuration changes can be entered in a 'free hand' intuitive manner. The configuration changes are shown on-the-screen as a 'what-you-see-is-what-you-get' drawing. Since the free-hand intuitive drawings entered by an user are not precisely according to scale or accurately represent the actual physical arrangements. The user interface subsystem 110 also includes a graphic user interface (GUI) dialog box 108 where a plurality of numerical data relating to the configuration, e.g., elevations, lengths, pressure, temperature, voltage, current, etc., are entered. The GUI dialog box 108 thus provides a channel for entry of numerical data for accurately representing the configuration changes corresponding to the free-hand drawings entered via the graphic interface means 104.

Figure 2A:
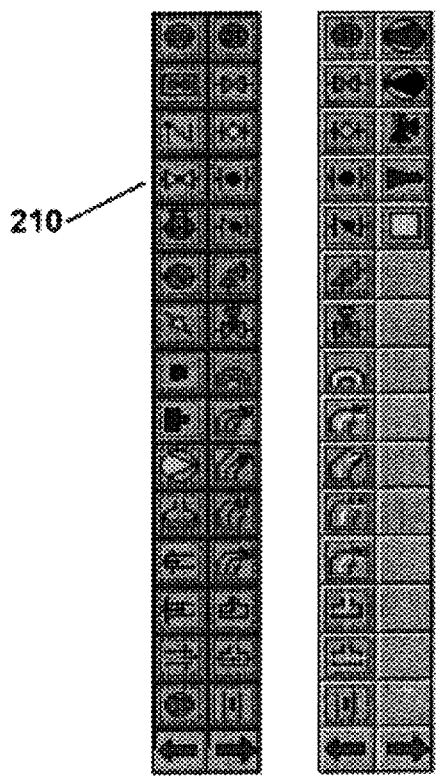
FIG. 2A shows a flow element and equipment carrousel for managing flow element and equipment changes.
Figure 2B:
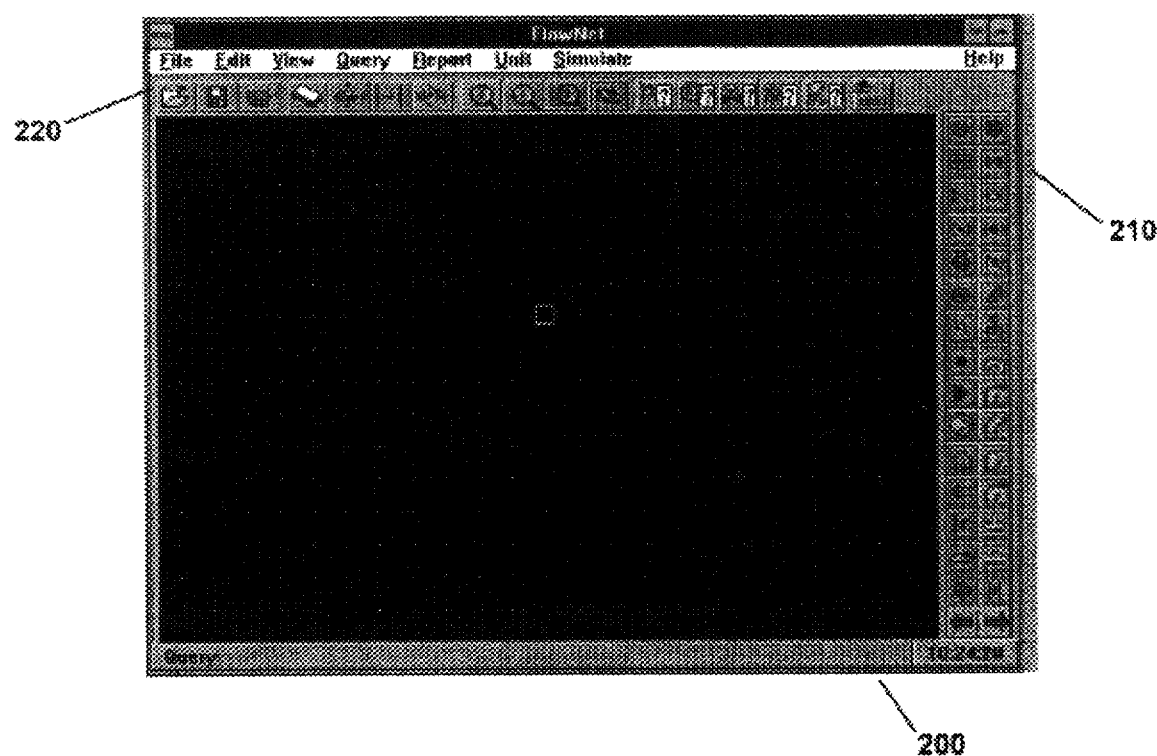
FIG. 2B shows a window displayed for the user interface of the configuration management system of FIG. 1.

In a preferred embodiment, the graphic interface means 104 is a personal computer or workstation window type input panel which further includes a component palette displaying a plurality of symbolic representation of system components or equipments. One example of a palette is shown in FIG. 2A for a piping system where a flow element and equipment 'carrousel' 210 is shown. It includes several strips, e.g., three different strips as shown, of palette for an user to choose different equipments, e.g., valves, pipe joints, etc., to add to a flow segment. Two strips are usually shown on the screen display. An user can apply the mouse to click on the arrows on the bottom of the strips to show a next strip either on the right or left depending which arrow the mouse is clicked. FIG. 2B shows a complete window 200 for the user interface subsystem. In addition to the flow element and equipment 'carrousel' 210 on the right hand side of the window as described above, the window 200 also includes a tool bar 220 on top of the window 200. The tool bar allows an user to perform different type of system design and graphic functions on the screen. For example, by the use of the tool bar 220, an user may reverse the flow on a particular segment of pipe by first clicking on the reverse flow box in the tool bar and then on the segment. An user can also perform different zooming and viewing functions by employing the tools provided in the tool bar. An user can perform three basic input functions by use of the graphic interface means 104, e.g., a computer mouse. An user can use the mouse to 1) draw and change the configuration by either adding to or deleting from the original configuration, 2) add or delete system components or equipments from different segments of the system, and 3) invoke GUI dialog box 108 to enter relevant data for a particular segment of the system. The user input thus provides three kinds of instructional data to the next process subsystem, i.e., an interactive linking actuator 120, to be described below. These three kinds of instructional data are 1) the location of a system where the configuration is to be changed, 2) the type of changes to be performed there and 3) numerical parameters relating to the configuration to be changed.

The configuration management system 100 also includes a second process subsystem which is an interactive linking actuator 120. It includes a graphic interpreter 122, a dialog box linker 124 and a database linker 126. The interpreter 122 and linkers 124 and 126 perform their functions in an interactive real-time manner. The graphic interpreter 122 continuously monitors user's graphic input from the graphic interface means 104. Once an user enters a graphic input, the graphic interpreter 122 immediately uses the graphic input to determine 1) the location of a system where the configuration is to be changed, and 2) the type of changes to be performed there. For example, when an user, applying a computer mouse, clicks on a particular segment of pipe and dragging an equipment, e.g., a valve, to add to a pipe segment, the graphic interpreter 122 immediately determines the location of that particular segment and generating an valve addition instruction as instructed by the user. The location data and valve addition instruction generated by the graphic interpreter 122 are used by the database linker 126 to establishes database pointers pointing to a database locations in a dynamic configuration database 130 for access to configuration data for that particular pipe segment and the relevant valve addition data. In the meantime, based on the pipe segment identified by the user and the type of configuration change to be performed, an instruction is also generated for the dialog box linker 124 to display an appropriate GUI dialog box 108 in the user interface subsystem. An user is prompted to enter all the relevant data relating to the configuration changes to be actuated by entering parameters from the dialog box 108. The database linker 126 receives the system parameters relating to configuration changes from the dialog box and stored these data into appropriate locations in the dynamic configuration data base 130. The dynamic configuration database 130 are therefore being updated interactively as soon as the user input are entered via the user interface subsystem 110 by the interactive linking-actuator 120.

The system configuration management system 100 further includes a performance-update process subsystem 140. The configuration changes received from an user via the user interface subsystem and stored in the dynamic configuration database 130 are applied by the performance update process subsystem to execute a system simulation analysis. Updated system performance parameters are generated by the performance update process subsystem as the results of the simulation analysis and also stored in the dynamic configuration database 130. These system configuration data are readily available for an user by open the dialog box 108 for any user identified segment of the system via the graphic interface means 104. In a preferred embodiment, the graphic interpreter 104 further continuously and interactively update the on-screen display shown by the graphic interface system 104 upon a set of parameters are entered via the dialog box 108 and/or upon a simulation analysis is completed by the performance update process subsystem 140. A most updated configuration display is continuously and interactively being shown to an user.

In summary, the present invention discloses a configuration management system 100 which includes a database 130 representing a system configuration. The configuration management system 100 further includes an user interface 110 for receiving user input of free-hand graphic drawings representing system configuration changes. The configuration management system 100 further includes an interactive graphic interpretive and linking actuator 120 employing the user input of free-hand graphic drawings representing the system configuration changes for linking to sections of the database 130 corresponding to the user input of configuration changes and updating data stored therein thus representing a new system configuration updated by the user input of the configuration changes. In a preferred embodiment, the user interface further includes a dialog box 108 for receiving system parameters relating to the user input of free-hand graphic drawings representing the system configuration changes. The interactive graphic interpretive and linking actuator 120 further employs the system parameters received from the dialog box 108 to update the database 130. In another preferred embodiment, the user interface 110 further include a system component palette for providing and displaying a plurality of system components to enable an user to add each of the system components to the system configuration. The interactive graphic interpretive and linking actuator 120 further employs the system components added to the system configuration for updating the database 130. In another preferred embodiment, the user interface 110 further include an updated configuration display means for interactively receiving updated configuration data from the database 130 and displaying the new system configuration updated by the user input of the configuration changes. In another preferred embodiment, the database 130 including a plurality of sections for storing configuration data wherein the sections being arranged according to an order corresponding to a plurality of coordinated configuration locations. The interactive graphic interpretive and linking actuator 120 further includes a configuration location determination means employing the user input of free-hand graphic drawings for determining a sequence of coordinated configuration locations for linking to sections of the database 130 corresponding to the user input of configuration changes.

Figure 3:
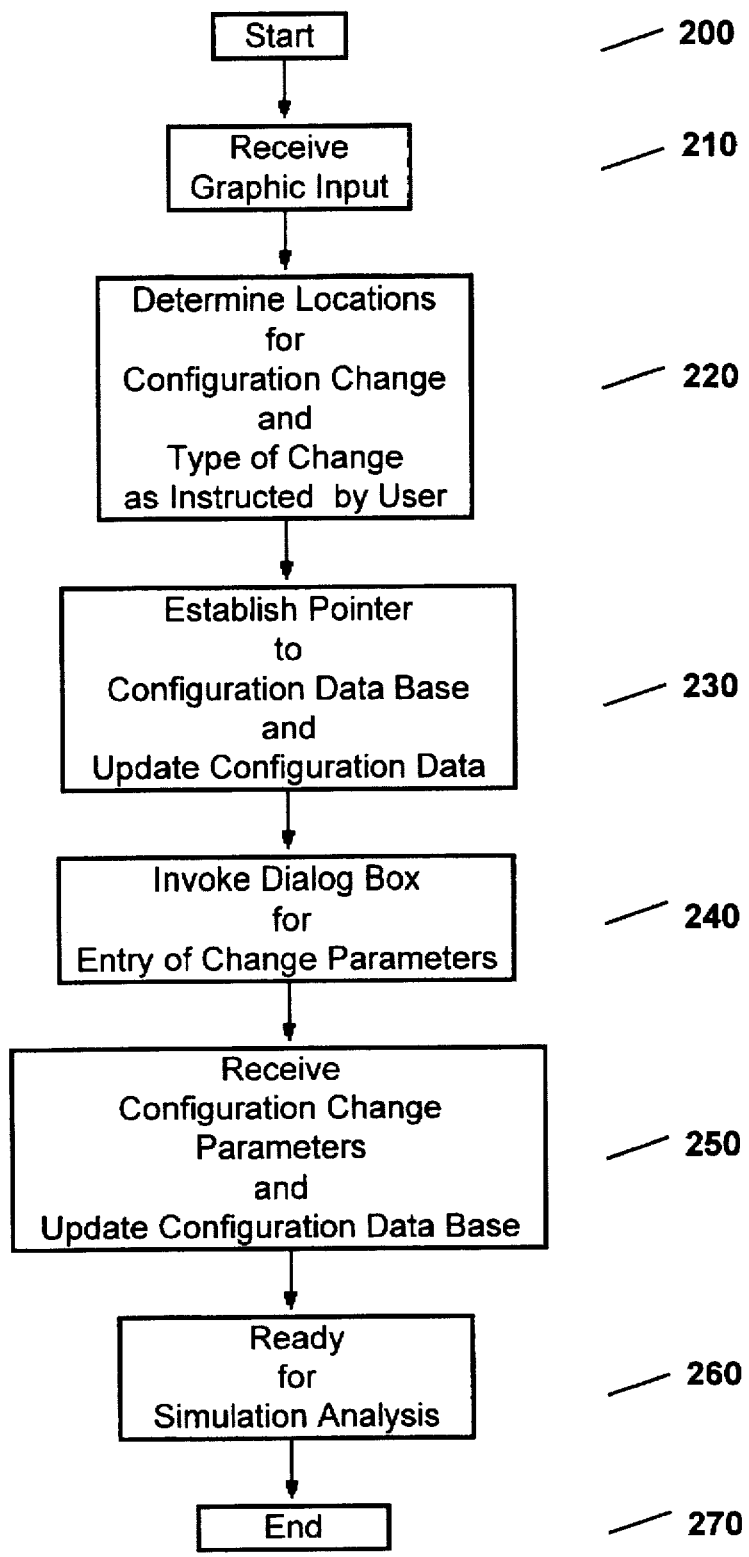
FIG. 3 is a flowchart showing the sequence of operations carried out by the interactive linking actuator of the configuration management system of FIG. 1.

FIG. 3 is a flow chart showing a sequence of processing steps performed by the interactive linking-actuator 120. The process begins (step 200) with the user interface subsystem 110 receives user graphic input via the user interface means 104, e.g., a light pen, a touch screen or a mouse (step 210). The interactive linking actuator employs the on-screen graphic input, e.g., a mouse-clicking on a flow segment, to determine the locations on the system where the configuration is to be updated and also the types of changes to be performed, e.g., adding or deletion of flow element or equipment such as a pump to a flow segment (step 220). A pointer to a particular section in the configuration database 140 is established for pointing to the database section for storage of the data of the locations where the configuration are to be changed and the configuration data stored therein are updated as instructed by the user graphic input (step 230). Based on the types and locations of changes as determined in step 220 a GUI dialog box 108 is invoked on the screen in the user interface subsystem 110 for the user to enter appropriate configuration change parameters (step 240). Upon receipt of the configuration data from the dialog box 108, the interactive linking actuator uses the database pointer to access the corresponding locations in the configuration database and update the configuration parameters as entered from the dialog box 108 (step 250). Thus, the interactive linking actuator 120 continuously and interactively updates the configuration database 130 immediately after the configuration change data are received from the user interface subsystem. Once the configuration database 130 is updated with the configuration change data received from the dialog box 108, it is ready for a simulation analysis to perform a performance update by the use of performance update process subsystem 140 (step 260).

Comparing to other computer-aided system design programs, the interactive linking actuator of the present invention provides a true graphic based configuration management system. An user is provided with great degree of freedom to redesign the system configuration with minimum numerical data entry requirements. Additionally, the updated configuration in its pictorial form is interactively shown to the user for mediate confirmation and verification.

In addition, this configuration management system can be coupled with a system simulation subsystem, e.g., a Hardy-Cross algorithm in a preferred network piping design system, to provide convenient and powerful design tools. The interactive configuration management system of this invention enables an user to apply free-hand intuitive drawing method for actuating the piping configuration changes, or an electric circuit change in an electric system. The following examples are only few applications of this configuration management system:

(1) An user can draw connecting line-segments to join two pipes together without the requirement of defining nodes or using a flow mixer for the joined pipes. Prior definition of a node or a junction by the entry of numerical data representing the joining of the pipes are eliminated. The graphic interpreter 122 is employed to apply the graphic input, i.e., the joining of two segments, to automatically interpret the system performance characteristics accordingly. For example, in a piping system for flow conduction, after the joining of these two segments, the interpreter automatically computes the flow rate and the energy passed from one segment to anther based on the principles of conservation of mass and energy. For an electrical circuit, the voltages and the currents of these two joined segments are also automatically computed based on appropriate circuit theorems.

(2) The configuration management system also allows a free-hand drawing method to join three or more connecting line segments to represent three or more pipes (or electric circuits) share a common junction. The interactive linking actuator will automatically update the relevant potions of the database interactively to reflect the joining of these segments in the system configuration.

(3) Applying a free-hand graphic method to draw a network of connecting line segments including a plurality of junctions. This can be performed without requiring declaration or definition of the nature of the node points or junctions including the mixing, i.e., convergence of multiple line segments, or splitting, i.e., divergence into multiple line segments. The system configuration database is interactively updated upon the completion of the graphic input, By the use of a simulation program, the balance of mass and energy, or the balance of currents and voltages, at different junctions are automatically analyzed with very minimum numerical entries to define the system configuration.

(4) By the use of pointing device, e.g., a computer mouse, to move one end of a segment to connect to a different segment. A different network is now in place with the configuration database automatically updated to represent the new configuration. Under certain conditions, if the configuration data, i.e., length and elevation of changed line segment, can be determined from the change input, no numerical input would be required.

(5) By the use of a pointing device as that in example (4) to move an entire line segment such that both ends of the moved segment are now connected to different points in the network A new network is again be represented by the interactively updated database with minimal or no numerical data entries required from the GUI dialog box 108.

(6) By the use of a mouse or other graphic input means, a flow resistance or restrictive component such as a valve or pipe fitting, or a resistor for an electric circuit, can be placed on a line segment without requiring to first breakdown the line segment into two segments. Through the functions performed by the interactive linking actuator 120, the configuration database 130 is updated in real time to represent the newly added component into that segment.

(7) By the use of a mouse or other graphic input means, a flow resistance or restrictive component such as a valve or pipe fitting, or a resistor for an electric circuit, can be moved from a line segment to a different line segment without requiring to first breakdown either line segments into two segments. Through the functions performed by the interactive linking actuator 120, the configuration database 130 is updated in real time to represent the newly moved component from one segment to a different segment.

In order to more clearly and specifically show the functional steps carried out by the configuration management system 100, Examples 1 and 2 are provided below with example on illustrated with FIGS. 4A to 4K to show the configuration management system 100 manages the configuration changes made on a water distribution system. The water distribution system includes water reservoirs which are interconnected with water pipes and powered with water pump. The configuration management system 100 is able to interactively applying the graphic user input to simulate the system performance, temporarily blocking off segment of water pipe from the water distribution system. Please refer to FIG. 4A, where a schematic of a simple water distribution system with three interconnected reservoirs is shown. For each reservoir, line size, straight length, total flow resistance coefficient and absolute roughness for each line are also shown below.

| Line ID | | Length | K | Abs Roughness |
| --- | --- | --- | --- | --- |
| Line-1 | 100 mm | 500 m | 12 | 0.04572 mm |
| Line-2 | 150 mm | 1000 m | 15 | 0.04572 mm |
| Line-3 | 130 mm | 700 m | 20 | 0.04572 mm |

The elevation for the first reservoir is 20 meters, the second 60 meters, and the third 30 meters. For the system shown, there are three questions to be answered by this configuration management system. The first question is the expected direction of flows and flow rates for the gravity flow in this system. The second question is to determine that when a pump is used to direct the water from reservoir 0 to reservoir 2 at a target flow rate of 100 m$^3$/hr, what is the pump head and power required. The third question is to determine what will be the power draw if flow to reservoir 3 can be blocked off under the same condition identical to that happen in the second question. Twenty one steps as listed below are applied by referring to FIGS. 4A to 4K to answer the above three questions.

The steps applied to answer the first Question:

1. In order to solve the first question, a user can use the mouse to draw the segment layout as that shown in FIG. 4A. Notice the direction of segment flow shown at this time only reflects the direction which the pipe was drawn. The actual flow will be properly exhibited after simulation.

Figure 4A:
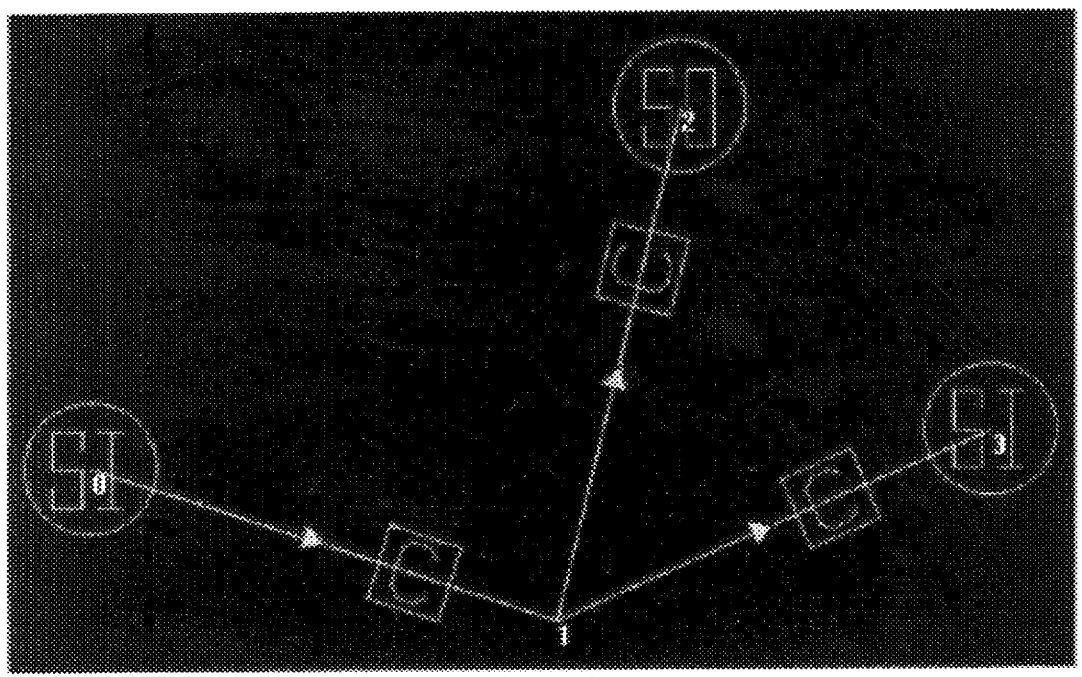
FIGS. 4A to 4K are on-screen displays for illustrating the functional steps carried out by the configuration management system for a water distribution system.
Figure 4B:
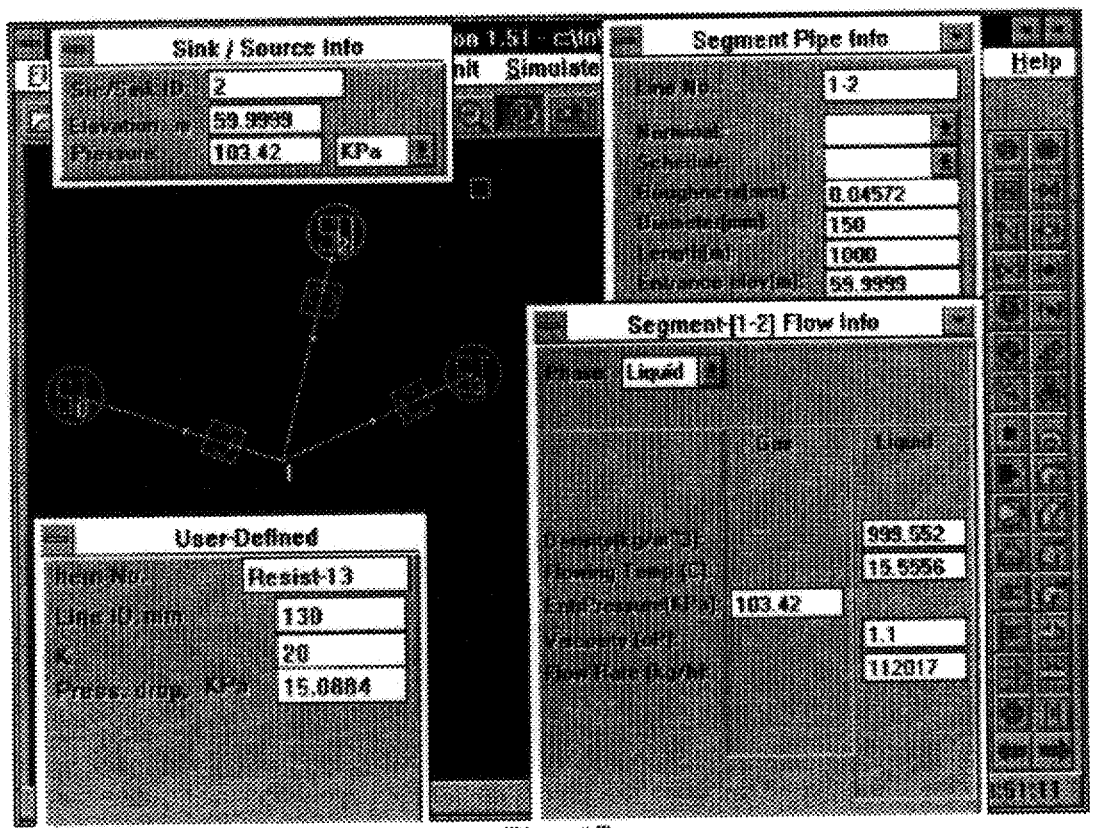
Figure 4C:
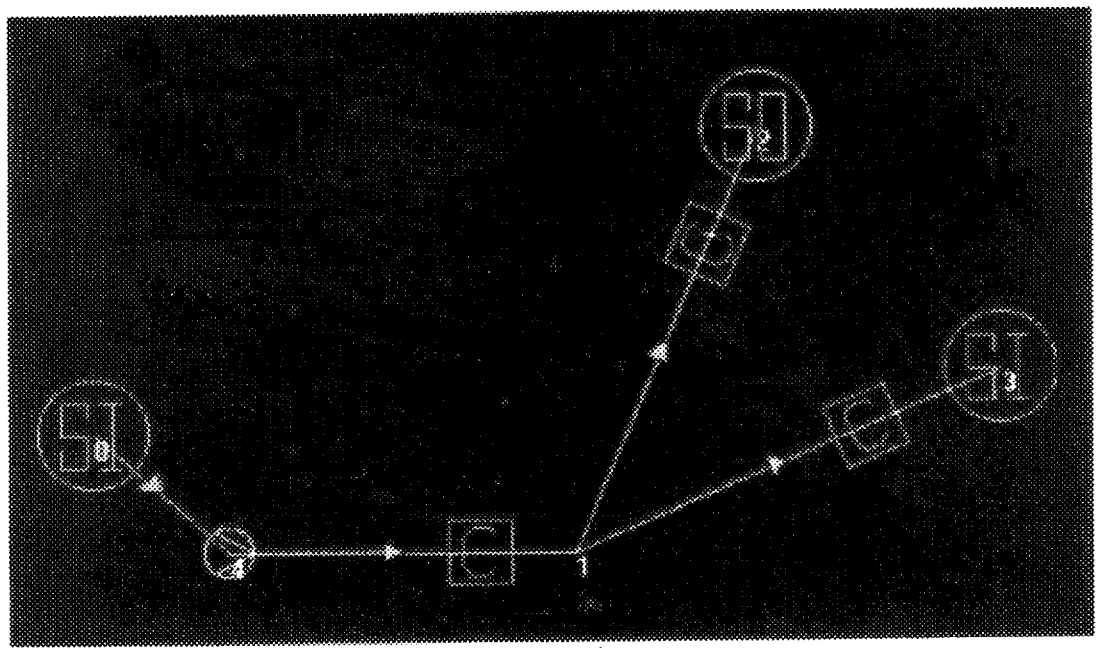
Figure 4D:
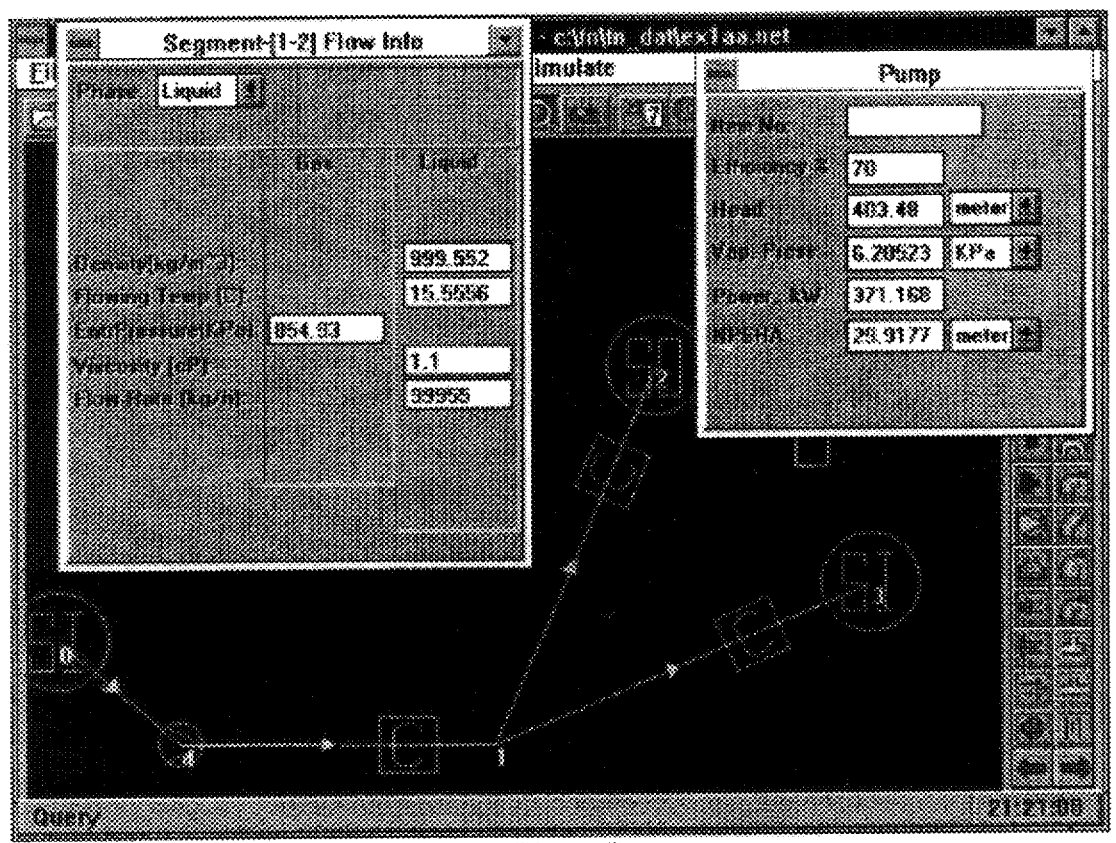

2. Referring to FIG. 4B, the dialog box is clicked open which shows "source/sinkInf" for filling in the values for elevation and pressure.

3. The dialog box further provides "segmentPipeInfo" to fill in the values for pipe inside diameter, absolute roughness, and length. In this particular example, only the entrance elevations for segments 1 and 3 are required while other values will be automatically calculated by the system.

4. The dialog box further provides a "SregmentFlowInfo" to fill in fluid, water, and flow properties for each pipe. (FIG. 4B)

5. A user then click commands Query Valve/Fitting to open the dialog box for user defined equipment items. By clicking the user defined symbol on Segment 1, the color of that segment is changed to identify that the information for that segment is being entered. Data for each Segment can then be entered through the dialog box. Click the field for flow resistance coefficient K through dialog box and enter the value by placing the cursor staying inside the dialog box when the data are keyed irk Click the user-defined symbol on segment 12 and the field for flow resistance coefficient K in the dialog box then key in the respective data therein. Repeating this step for segment 13.

6. Click the simulation button to initiate the simulation process and a "Simulation Completed" sign will appear in the status bar when the simulation process is completed.

7. The calculated the flow rate for each flow segment can be examined by using the dialog box segment flow information box again. Click the desired pipe segment to view the flow rate as shown in FIG. 4B.

8. Answer to the first question is provided from the simulation result which shows that the water flows from the reservoir 2 to reservoir 1 and 3. And the flow split is 47.6% (15 Kg/sec) of the flow to reservoir 0 is 52.4% (16 kg/sec) of the flow to reservoir 3.

The steps applied to answer the second Question:

9. Click the pump icon and then the flow segment 1 to attach a pump to segment 1.

10. Use the Reverse Pump button to show the pumping direction when necessary as that shown in FIG. 4C.

11. Pump elevation is assumed to be at zero elevation for illustration purpose.

12. Click open dialog box pump/compress flow to provide the pump data of pump efficiency, pump head and vapor pressure.

13. Click the Simulate button.

14. Examine the calculated flow rate through segment 12. Varying the pump head and simulate it again until the desired flow rate of 100 m$^3$/hr or 28 Kg/sec is obtained as that shown in FIG. 4D.

15. The answer to the second question is obtained which shows that the required pump head is 404 meters and the power into the pump is 373 KW (499 Bhp).

Figure 4E:
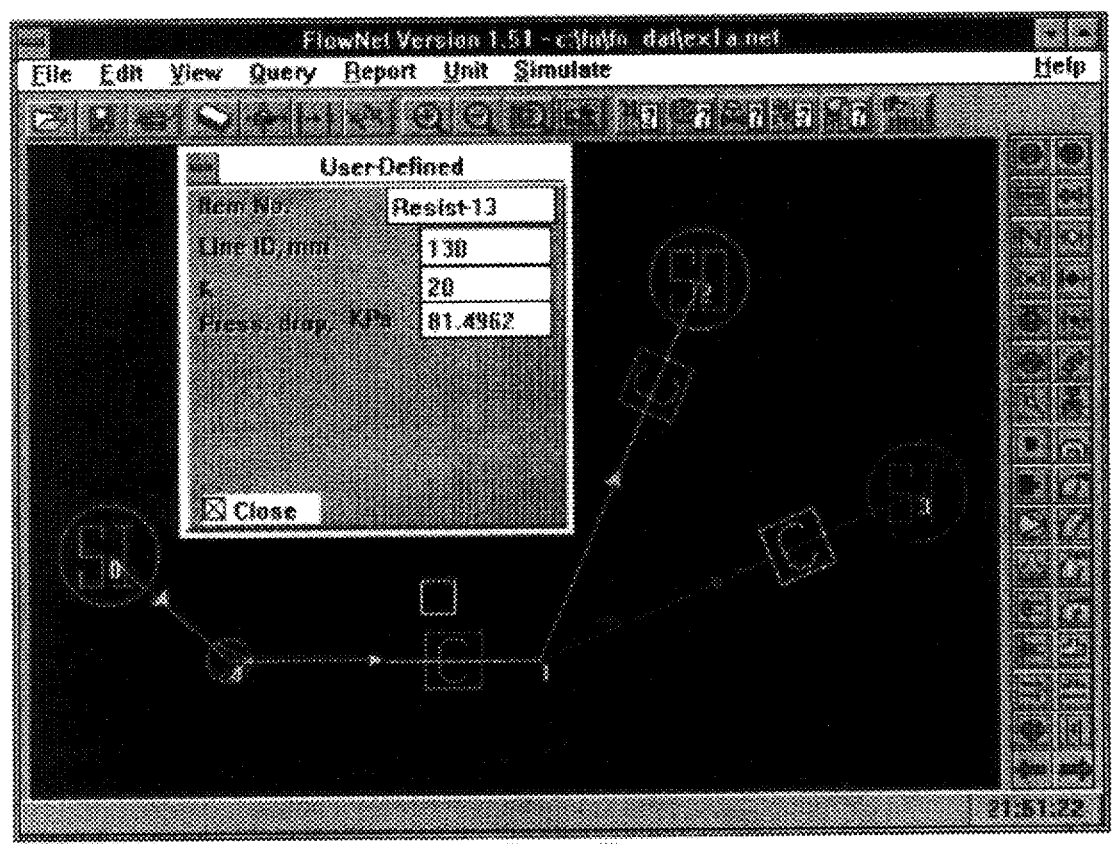
Figure 4F:
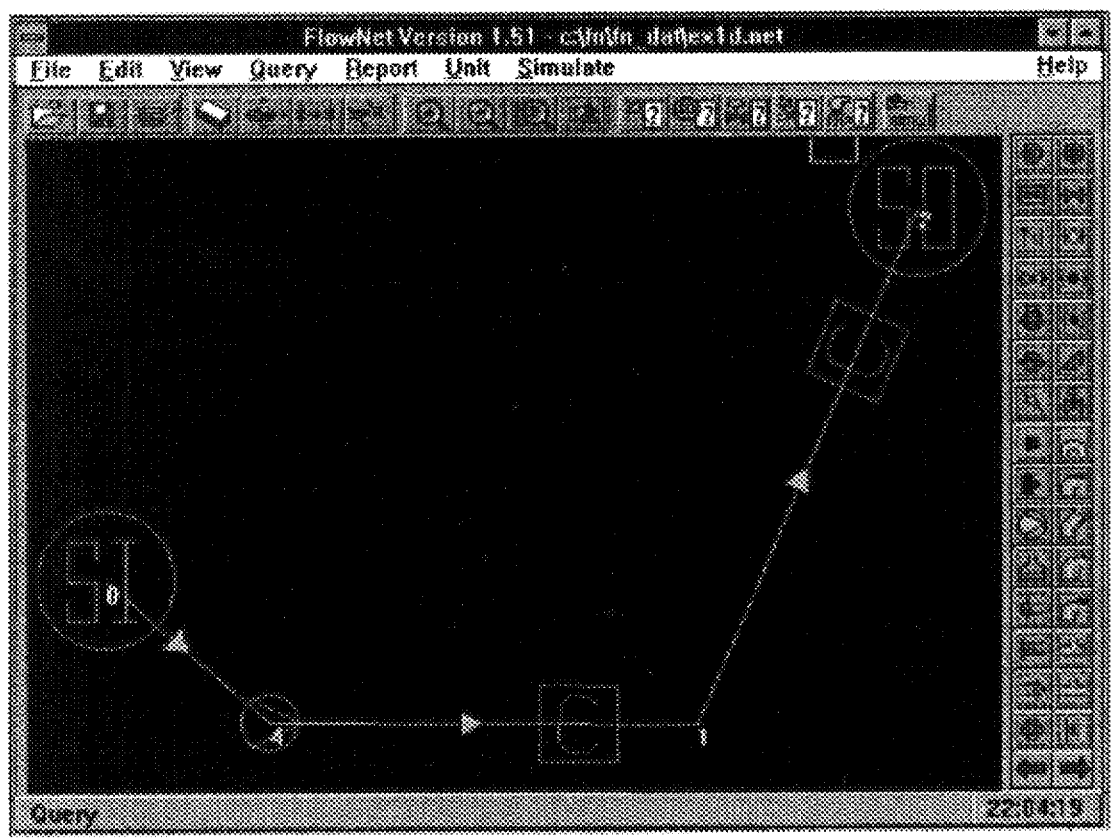
Figure 4G:
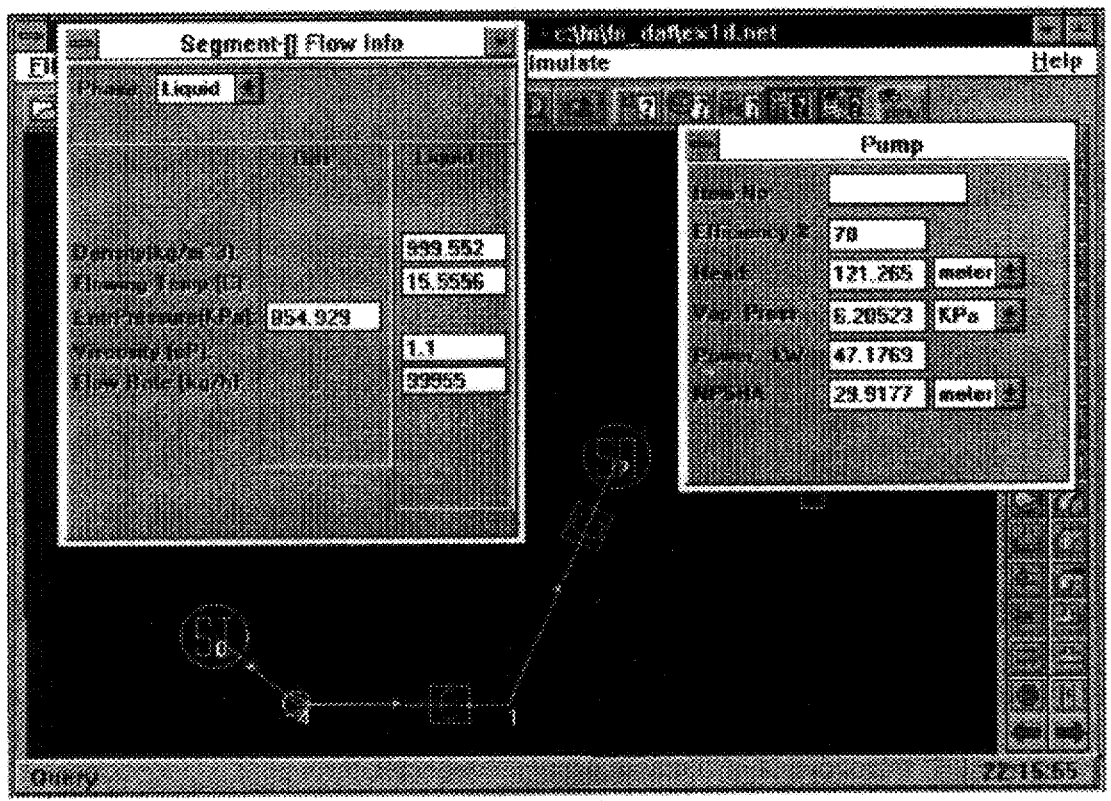
Figure 4H:
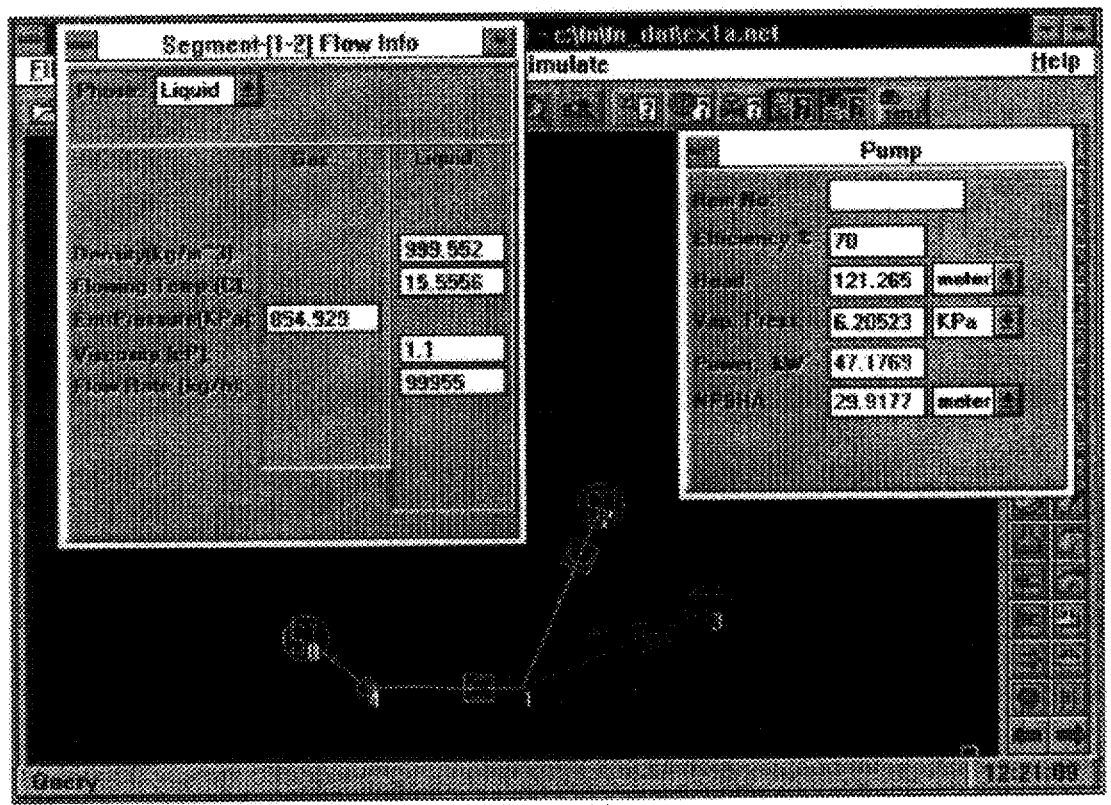
Figure 4I:
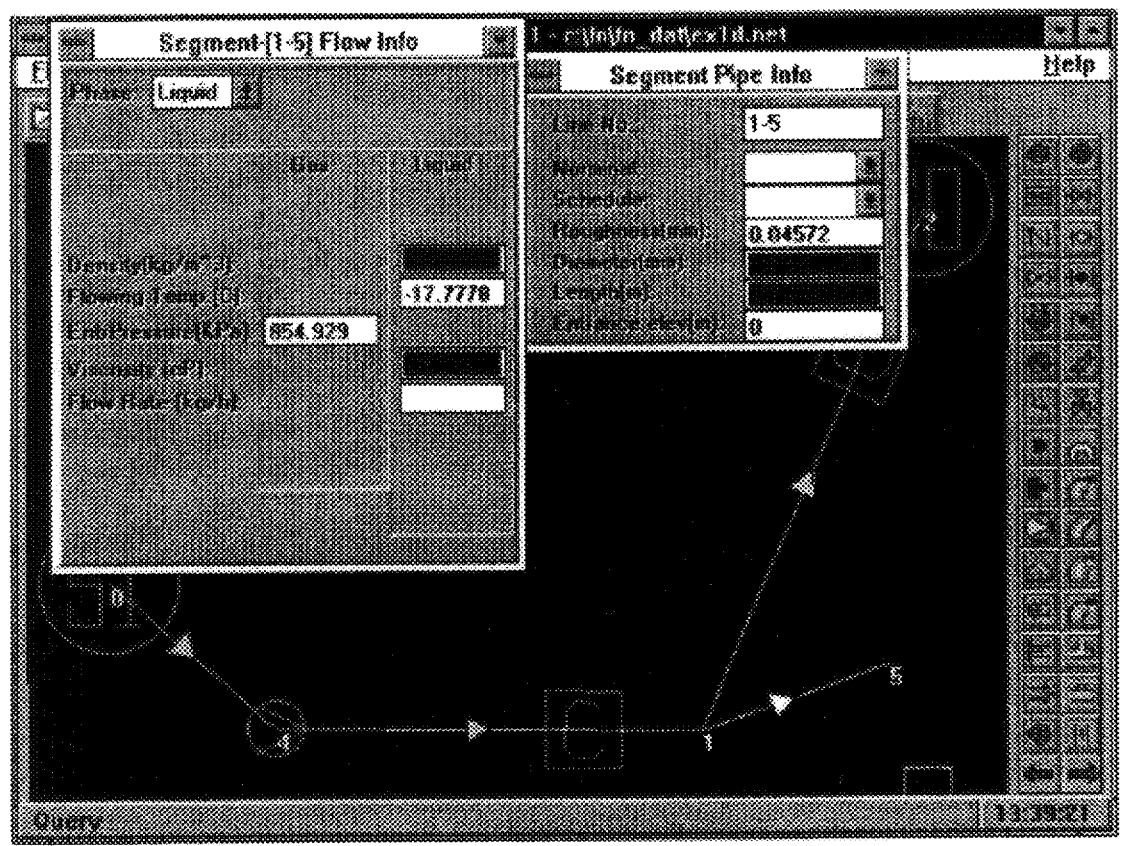
Figure 4J:
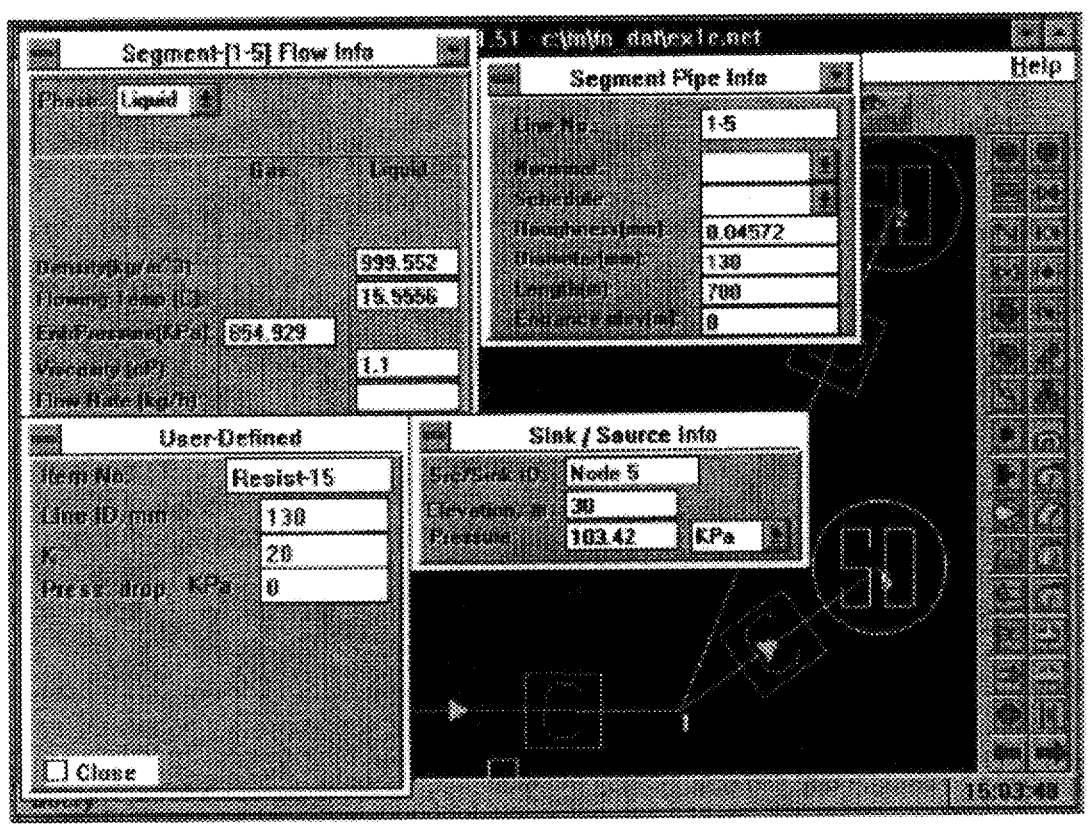
Figure 4K:
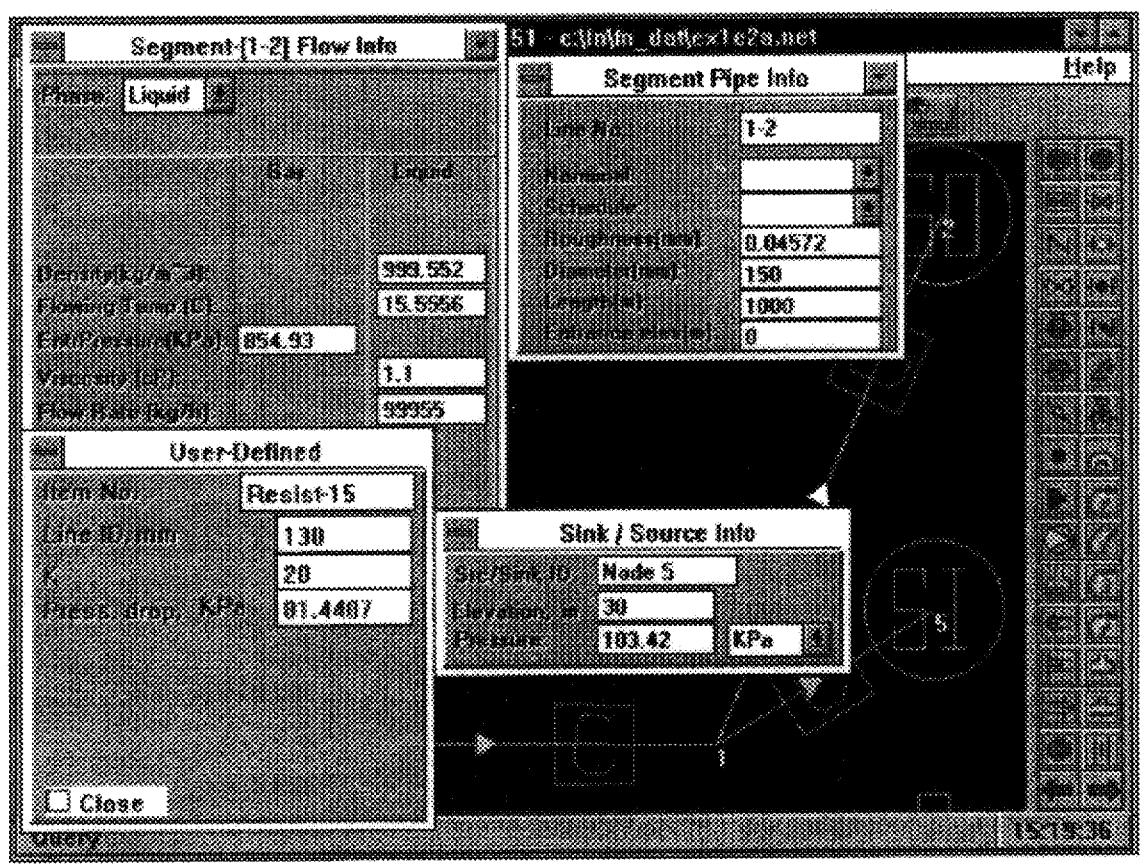

The steps applied to answer the third Question:

16. There are two different ways to close the flow in Segment 13:

i) In case it is desirable to temporarily block off segment 13 and preserve the entire setup then first click the Query Valve Fitting to open the dialog box for valve then click the user defined symbol to high light it. Click the close option in the valve fitting dialog box to close the segment 13 and the segment 13 and all the components on that segment will be shown in red color (FIG. 4E). Then click the Simulate button to perform the simulation and update the database for the new configuration.

ii) If the segment is to be permanently removed, then click the Edit Delete Pipe and click on segment 13 which will cause the segment 13 to be removed.

17. Again, click on the Simulate button to perform the simulation for updating the database for the new system configuration.

18. Examine the calculated flow rate through segment 12. Varying the pump head and simulate it again, till the desired flow rate of 100 m³/hr or 28 Kg/sec is obtained as that shown in FIG. 4G or FIG. 4H.

19. Simulation results provide the answer to the third question wherein a required pump head is 120 meters and the power into the pump is 46.3 KW (62 Bhp).

20. If the flow segment which was deleted before is required again for the system, then simply draw the flow segment again by clicking the Add Pipe icon. By opening a dialog box at this time a newly added pipe has no information except the default pipe data. (See FIG. 4I)

21. In order to restore the original configuration as that shown in FIG. 4D, entering data into the segment pipe information box for the segment added as that shown in FIG. 4J. Then click the Simulate button to update the data base back to the system as that shown in FIG. 4D. (See FIG. 4K).

A two-pass furnace is shown in Example 2. A configuration change is made to the furnace to convert this two-pass system to a four-pass furnace. Example 2, illustrated with FIGS. 5A to 5H, shows the functional steps carried out by the configuration management system 100 to perform this two-pass to four-pass conversion and how the user graphic input is interactively applied together with the change parameters entered via the dialog box 108 to achieve the two-pass to four-pass conversion in real-time. A user of this configuration management system 100 can apply the graphic input means 104 to graphically change the configuration on the screen and enter, if necessary, few relevant change parameters via the dialog box 108. The conversion of the two-pass to four-pass furnace is performed interactively under the control of the user. A user is provided with most updated graphic representation on the screen and also the related data in the database. A system performance simulation is ready to be performed with the most updated database once the configuration changes are entered from the graphic input means 104 and the dialog box 108.

Figure 5A:
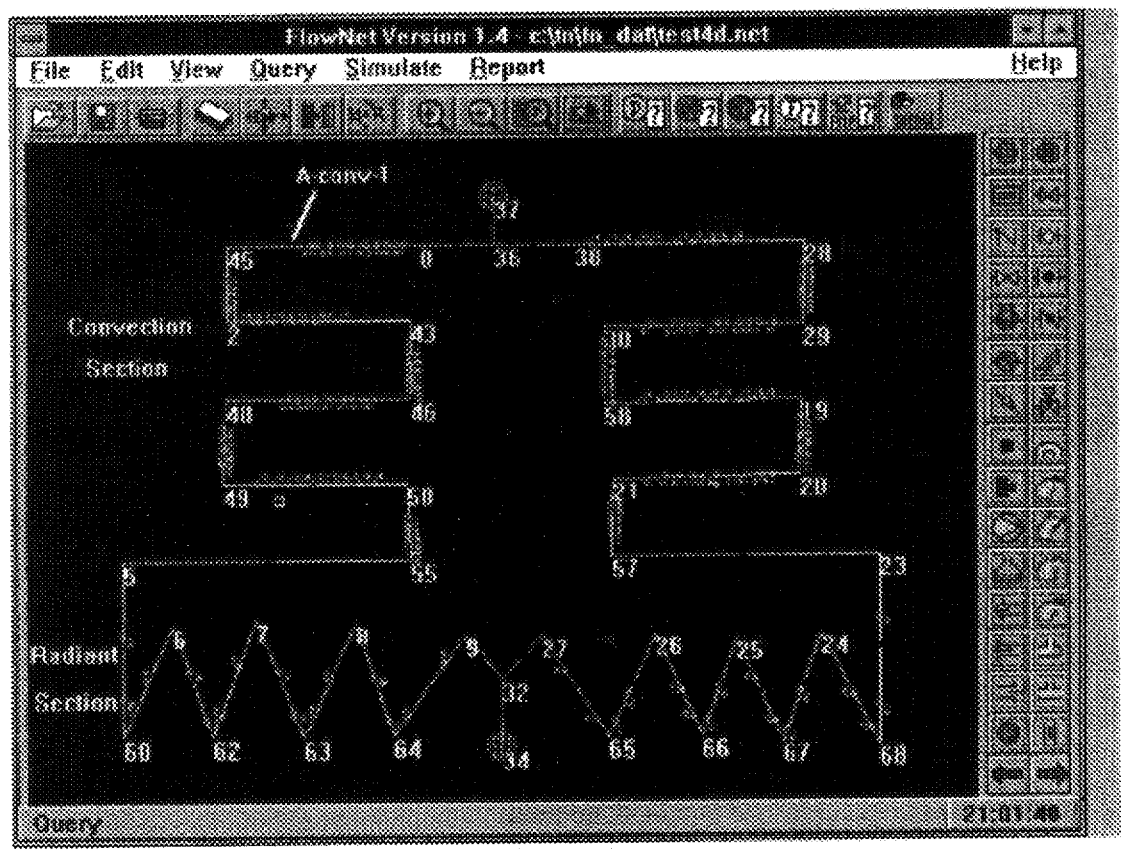
FIGS. 5A to 5H are on-screen displays for illustrating the functional steps carried out by the configuration management system for converting a two-pass furnace to a four-pass furnace.

Please refer to FIGS. 5A to 5H again where a two-pass furnace tube fluid hydrodynamics is modeled by using the configuration management system of this invention. Flow segments are used to simulate continuous furnace coils. Illustrated in this example involves initially using eight flow segments for each tube pass for one convection and radiant coil respectively (FIG. 5A). In each tube pass, there are total of 80 U-bends for the convection coil and 16 U-bends for the radiant coils. These U-bends which are represented by the symbol circle, are evenly incorporated to flow segments for simulation purposes as shown in FIG. 5A. For a target feed rate of 611,000 pounds per hour which is equivalent to 47,000 barrels per day of 27.2 API gravity at a furnace outlet pressure of 73 psia, outlet temperature of 678 F, and 7.5 weight percent furnace feed vaporization, the simulation results show that the required furnace inlet pressure is 210 psia as that shown in FIG. 5B. In order to reduce the inlet pressure, the convection section will be re-passed without adding tubes to become a four-pass configuration. The estimated furnace inlet pressure is to be determined in this example. As shown in this example, the configuration management system is able to modify the graphic input and to maintain and update the dynamic data base when the configuration of the system is changed.

Figure 5B:
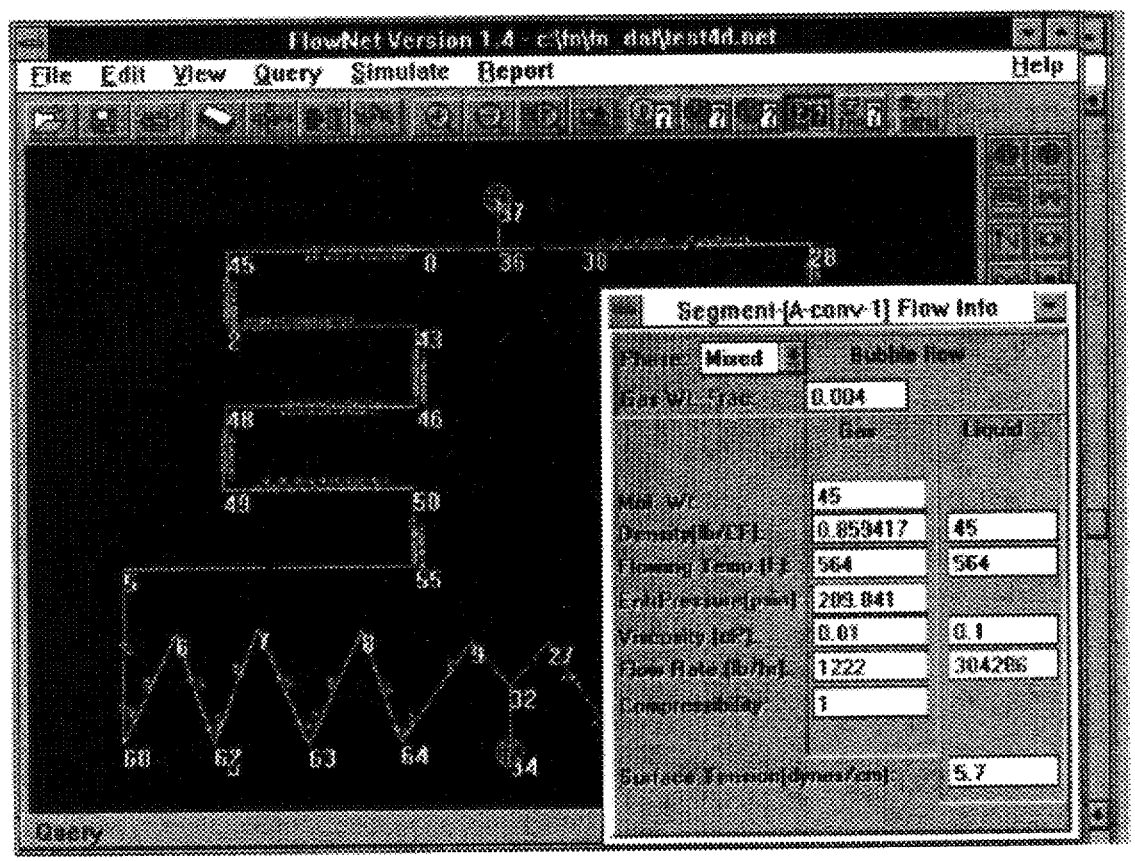
Figure 5C:
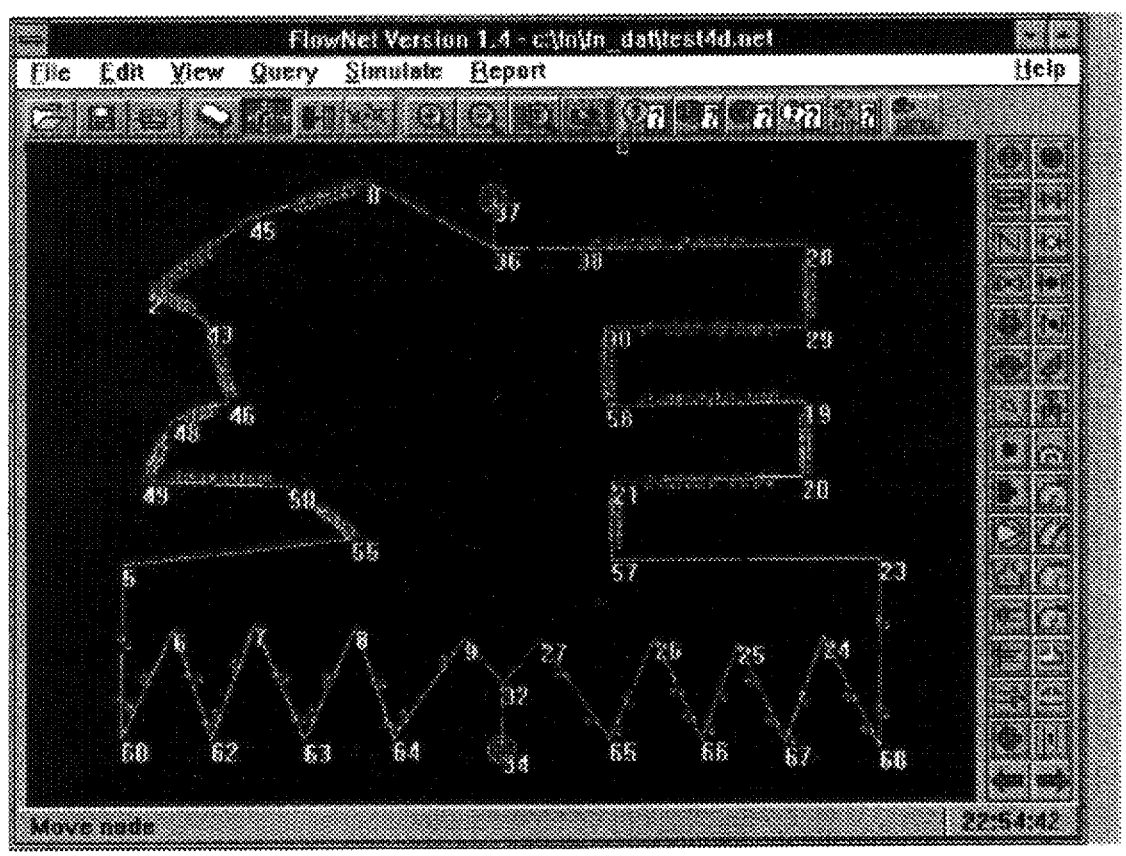
Figure 5D:
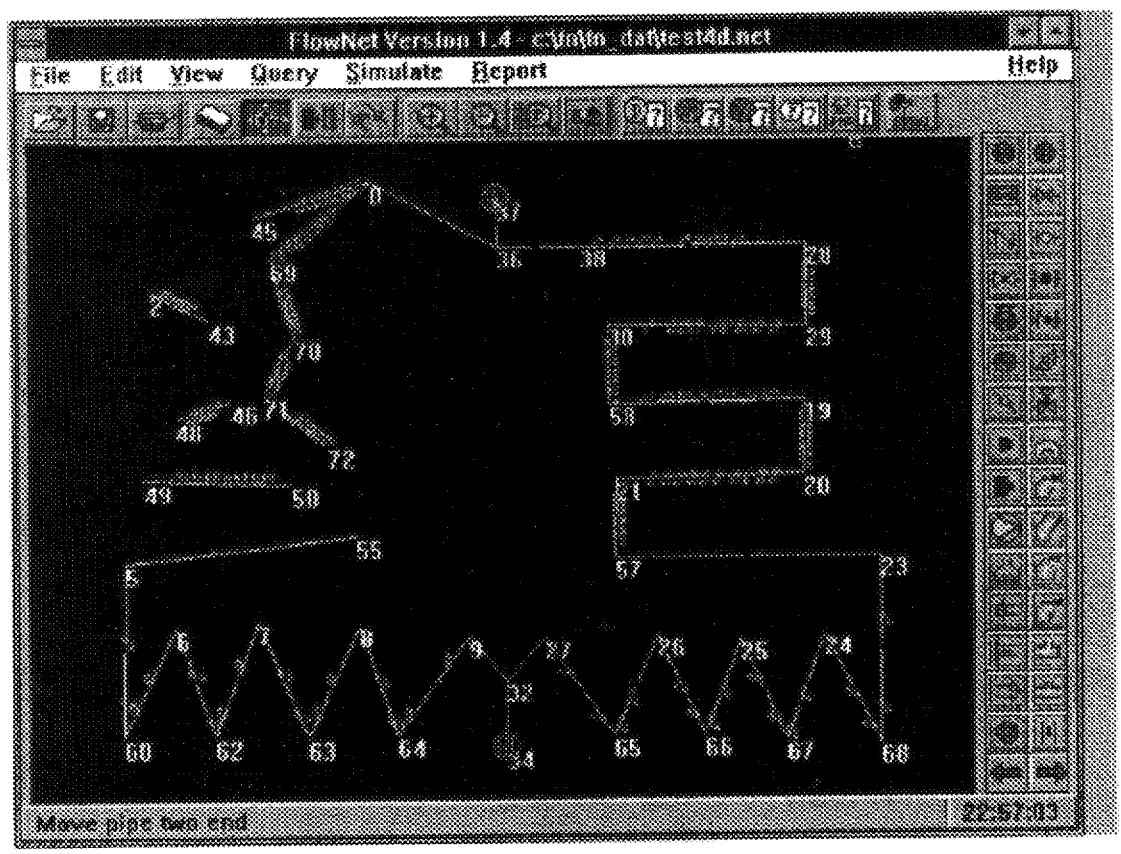

In FIG. 5B, the dialog box is opened to enter the segment flow information to provide data for the configuration management system for performing a simulation to determine the furnace inlet pressure. In FIG. 5C, the nodes of the system are moved freely to create more screen space for a subsequent user graphic input. All system components stay on the segments which are being moved during this movement process. In FIG. 5D, the flow segments are moved around and rearranged. Again, all system components on each segment are also rearranged accordingly without changing the relative position between the components for each segment. Segment 45-2 is moved to become segment 0-49. Segment 43-46 is moved to become segment 69-70. Segment 48-49 is moved to become segment 70-71, and segment 50-55 is moved to become segment 71-72.

Figure 5E:
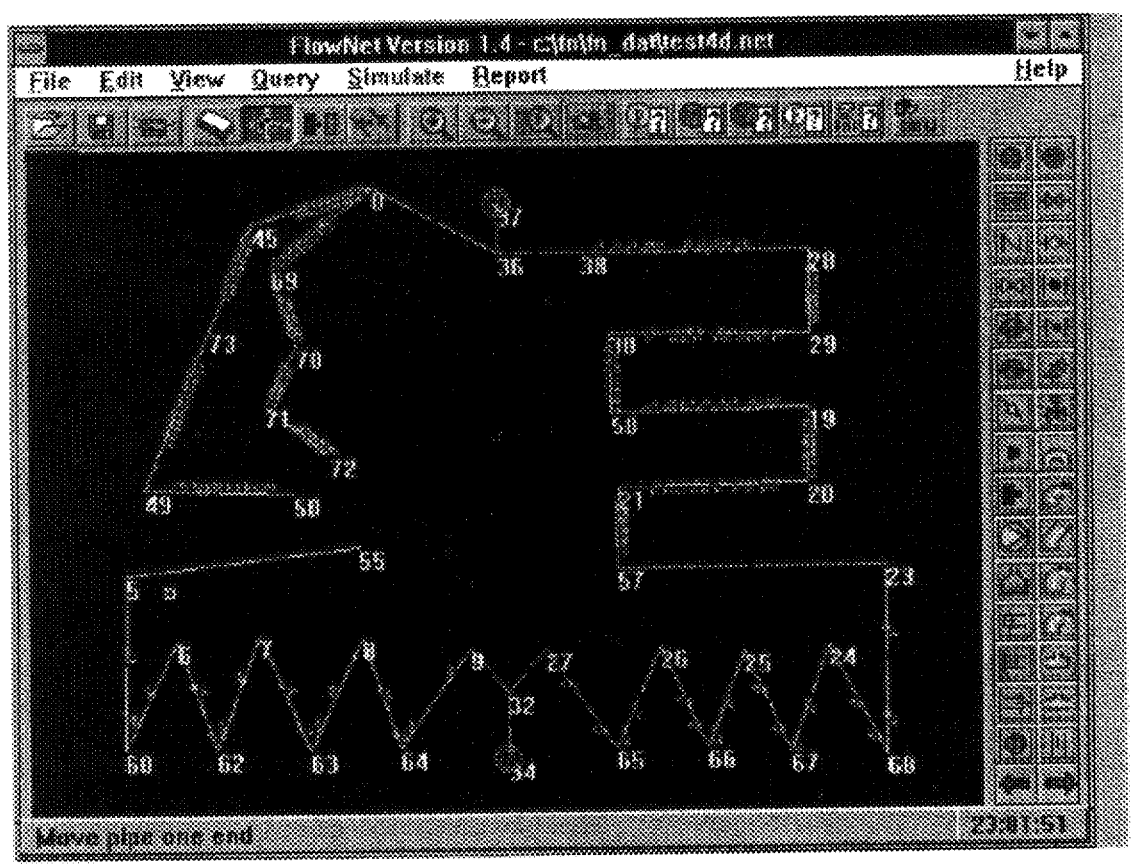
Figure 5F:
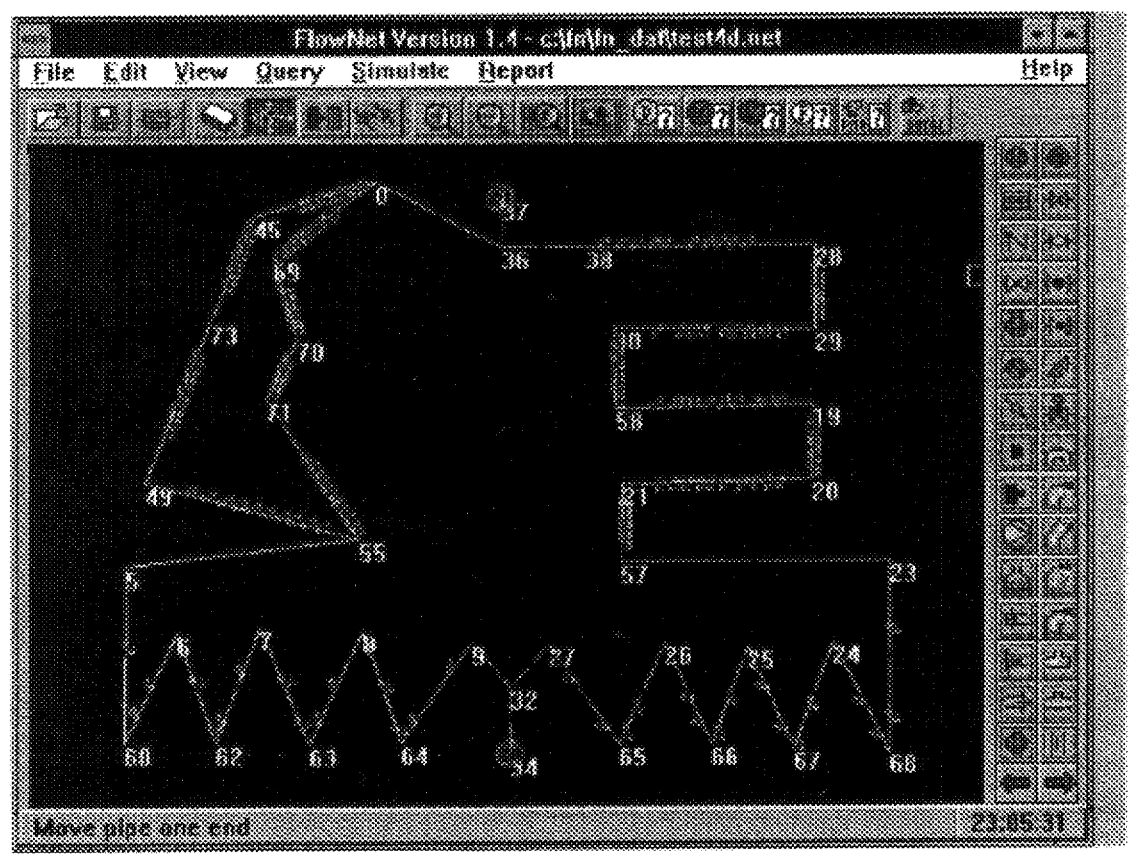

In FIG. 5E, two flow segments can be reattached together to form a new flow configuration. System components are moved with the moving segment and stay on the segment. Node 2 is moved to combine with node 45, node 46 is moved to node 43 to become node 73, and node 48 is moved to combine with node 49. In FIG. 5F, a multiple flow segments are attached together to form a new flow configuration where nodes 72, 50, and 55 are combined to become a common node 55.

Figure 5G:
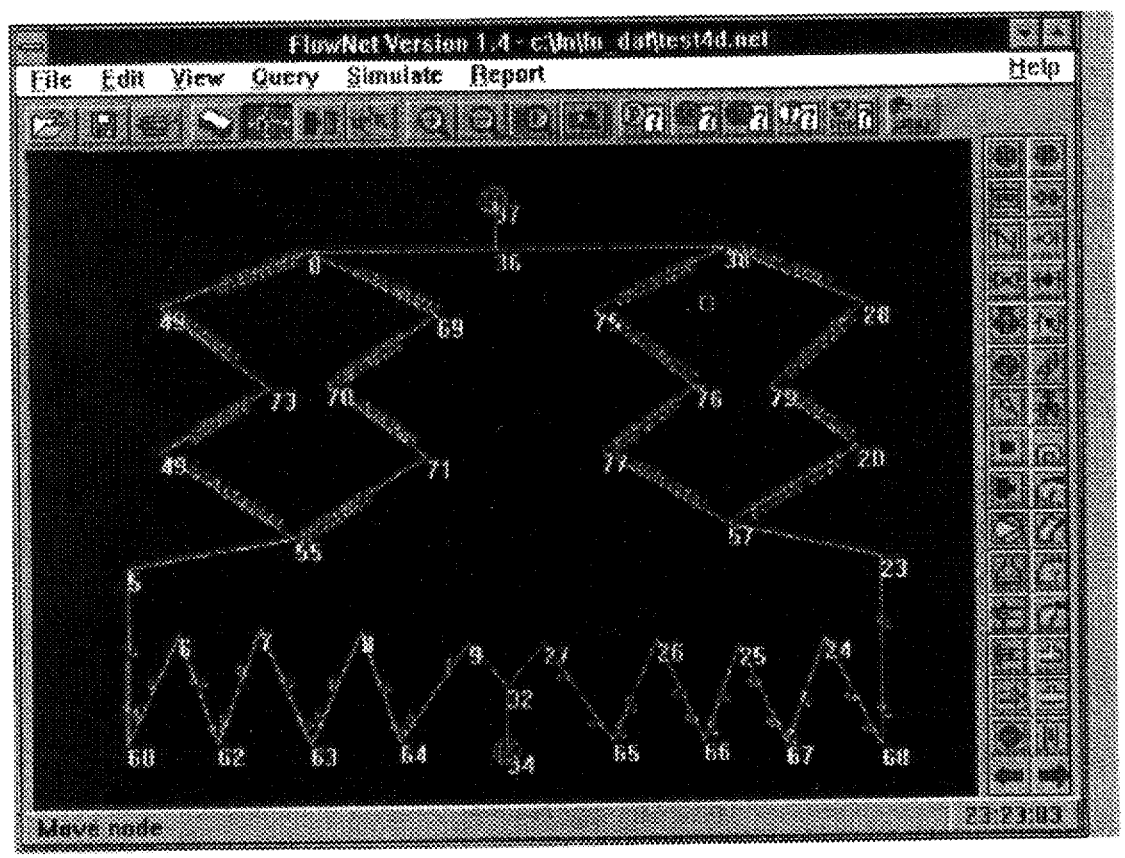
Figure 5H:
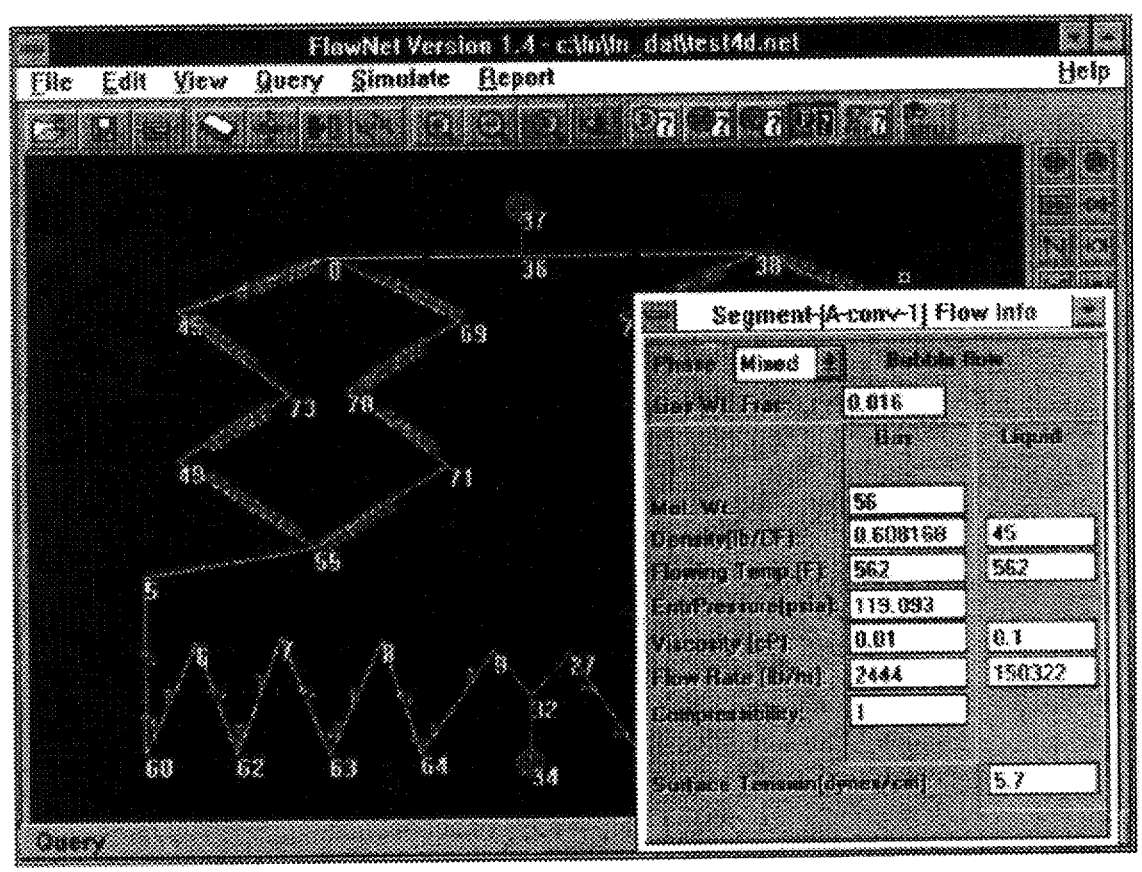

In FIG. 5G, it is demonstrated that the overall system configuration can be modified at any time and the configuration data are dynamically updated in database according to the changes made to the system configuration by the user through the graphic user input (GUI). In FIG. 5H, the database is reconfigured automatically and the reconfigured database can be viewed from a dialog box showing a segment flow information for segment 0-45. By clicking the "SIMU" button to simulate the furnace pressure drop with the new flow configuration, the simulation result indicates that a furnace inlet pressure can be lowered to 119 psia for the constant total flow rate of 611,000 pound per hour. New parameters such as gas weight fraction, gas molecular weight, and flashing temperature are reentered so that these parameters are corresponding to the new coil pressure profile.

Therefore, the present invention provides an intelligent real-time graphic-object to database linking actuator including a graphic interpreter with dialing box to allow on-screen intuitive modification and actuation of the changes to system configuration such that the difficulties and limitations in the prior art can be overcome. Specifically, an user can use graphic input, e.g., drawing directly on the on-screen pictures, to perform on-screen modification and to actuate system configuration changes such that immediate visual inspection of the system changes are interactively available to an user. Furthermore, by allowing user to use direct graphic input to perform on-screen modification and to actuate system configuration changes, the configuration can be flexibly and expeditiously re-designed without extensive numerical data entry efforts. The intelligent real-time graphic-object to database linking actuator as disclosed in this invention thus enables the system design and simulation analysis to be performed interactively and dynamically.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A configuration management and performance simulation system including a database including geometrical data for defining a system configuration and engineering data for computing performance characteristics, said configuration management system further comprising:

an user interface for receiving user input of graphic free-hand drawings representing system configuration changes;

said user interface further include a dialog box for receiving user input of system geometrical parameters and engineering data relating to said user input of graphic drawings representing said system configuration changes; and an interactive graphic interpretive and linking actuator employing said user input of graphic drawings representing said system configuration changes and said user input using said dialog box for linking to sections of said database corresponding to said user input of configuration changes and updating said geometrical data for defining said system configuration and engineering data for computing said system performance characteristics stored in said sections in said database thus representing a new system configuration updated by said user input of said configuration changes.

2. The configuration management and performance simulation system of claim 1 wherein:

said user interface further include a system component palette for providing and displaying a plurality of system components to enable an user to add each of said system components to said system configuration; and said interactive graphic interpretive and linking actuator further employing said system components added to said system configuration for updating said geometrical data for defining said system configuration and said engineering data for computing system performance characteristics in said database.

3. The configuration management and performance simulation system of claim 2 wherein:

said user interface further include an updated configuration display means for interactively receiving updated geometrical data for defining said system configuration and updated engineering data for computing system performance characteristics from said database and displaying said new system configuration updated by said user input of said configuration changes.

4. The configuration management and performance simulation system of claim 3 wherein:

said database including a plurality of sections for storing said geometrical data for defining said system configuration and said engineering data for computing system performance characteristics wherein said sections being arranged according to an order corresponding to a plurality of coordinated configuration locations; and said interactive graphic interpretive and linking actuator further includes a configuration location determination means employing said user input of graphic drawings for determining a sequence of coordinated configuration locations for linking to sections of said database corresponding to said user input of configuration changes.

5. The configuration management and performance simulation system of claim 4 further comprising:

an update simulation means for performing a simulation of said new system configuration updated by said user input.

6. The configuration management and performance simulation system of claim 5 wherein:

said user interface further receiving said user input of graphic drawings of connecting two line segments representing said system configuration changes for connection of two pipes; and said interactive graphic interpretive and linking actuator further employing said graphic drawings of connecting two line segments to update said database including said geometrical data for defining said system configuration and said engineering data for computing system performance characteristics representing said new configuration including the connection of said two pipes.

7. The configuration management and performance simulation system of claim 5 wherein:

said user interface future receiving said user input of graphic drawings of connecting a plurality of line segments representing said system configuration changes for connection of a plurality of pipes to a common junction; and said interactive graphic interpretive and linking actuator further employing said graphic drawings of connecting said plurality of line segments to update said database including said geometrical data for defining said system configuration and said engineering data for computing system performance characteristics representing said new configuration including the connection of said plurality of pipes to said common junction.

8. The configuration management and performance simulation system of claim 5 wherein:

said user interface future receiving said user input of graphic drawings of network of connecting a plurality of line segments representing said system configuration changes for connection of a plurality of pipes with a plurality of junctions; and said interactive graphic interpretive and linking actuator further employing said graphic drawings of said network in connecting said plurality of line segments to update said database including said geometrical data for defining said system configuration and said engineering data for computing system performance characteristics representing said new configuration including the connection of said plurality of pipes with said plurality of junctions.

9. The configuration management and performance simulation system of claim 5 wherein:

said user interface future receiving said user input of graphic drawings of connecting one end of a line segment to a second line segment representing said system configuration changes for connecting one end of a first pipe to a second pipe; and said interactive graphic interpretive and linking actuator further employing said graphic drawings of connecting one end of a line segment to a second line segment to update said database including said geometrical data for defining said system configuration and said engineering data for computing system performance characteristics representing said new configuration including the connection of one end of said first pipe to said second pipe.

10. The configuration management and performance simulation system of claim 5 wherein:

said user interface future receiving said user input of graphic drawings of moving a first line segment to connect to a second line segment representing said system configuration changes for moving a first pipe to connect to a second pipe; and said interactive graphic interpretive and linking actuator further employing said graphic drawings of moving a first line segment to connect to a second line segment to update said database including said geometrical data for defining said system configuration and said engineering data for computing system performance characteristics representing said new configuration including the moving a first pipe to connect to a second pipe.

11. The configuration management and performance simulation system of claim 5 wherein:

said user interface future receiving said user input of graphic drawings of adding a system component from said component palette to a segment representing said system configuration changes for adding said system component to a pipe line; and said interactive graphic interpretive and linking actuator further employing said graphic drawings of adding a system component from said component palette to a segment to update said database including said geometrical data for defining said system configuration and said engineering data for computing system performance characteristics representing said new configuration including the adding said system component to a pipe line.

12. The configuration management and performance simulation system of claim 5 wherein:

said user interface further receiving said user input of graphic drawings of moving a system component from a first line segment to a second segment representing said system configuration changes for moving said system component from a first pipe line to a second pipe line; and said interactive graphic interpretive and linking actuator further employing said graphic drawings of moving a system component from a first line segment to a second segment to update said database including said geometrical data for defining said system configuration and said engineering data for computing system performance characteristics representing said new configuration including the moving said system component from a first pipe line to a second pipe line.

13. The configuration management and performance simulation system of claim 5 wherein:

said user interface further receiving said user input of graphic drawings of moving a line segment representing a move of a pipe including a plurality of system components therein; and said interactive graphic interpretive and linking actuator further employing said graphic drawings of moving said line segment representing said move of said pipe with said plurality of system components to update said database including said geometrical data for defining said system configuration and said engineering data for computing system performance characteristics representing said new configuration including the move of said pipe including said plurality of components which being moved together with said pipe.

14. A configuration management and performance simulation method comprising the steps of:

(a) receiving user graphic free-hand input using a user interface means and receiving, through a dialog box, displayed on a monitor, user input of configuration changes and engineering data relating to said user graphic free-hand input;

(b) employing said user graphic free-hand input and said configuration changes and engineering data entered through said dialog box for determining a plurality of locations on a system for configuration update;

(c) employing said user graphic free-hand input for identifying a plurality of types of configuration changes;

(d) establishing a pointer for pointing to a particular section in a configuration database corresponding to each of said locations for configuration update; and (e) applying said plurality types of configuration changes for updating configuration data including geometrical data for defining a system configuration and engineering data for computing system performance characteristics stored in each of said particular sections in said configuration database.

15. The configuration management and performance simulation method of claim 13 further includes the steps of:

(f) applying said types of changes and said locations of configuration update for invoking a graphic user interface (GUI) dialog for receiving a plurality of user input of configuration change parameters; and (g) applying said configuration change parameters from said GUI dialog box and said pointer pointing to said configuration database for interactively updating said configuration database including said geometrical data for defining said system configuration and said engineering data for computing system performance characteristics.

* * * * *